(12) United States Patent
Engelken (10) Patent No.: US 9,969,313 B2
(45) Date of Patent: May 15, 2018

(54) TRAILER WITH TILT SYSTEM (71) Applicant: Alfred L. Engelken, Vermillion, KS (US)

(72) Inventor: Alfred L. Engelken, Vermillion, KS (US)

(*) Notice: Subject to any disclaimer, the term of this patent is extended or adjusted under 35 U.S.C. 154(b) by 20 days.

(21) Appl. No.: 15/094,763

(22) Filed: Apr. 8, 2016

(65) Prior Publication Data
US 2016/0297342 A1  Oct. 13, 2016

Related U.S. Application Data (60) Provisional application No. 62/144,580, filed on Apr. 8, 2015.

(51) Int. Cl.
  *B60P 1/43* (2006.01)
  *B60D 1/46* (2006.01)
  *B60P 3/12* (2006.01)

(52) U.S. Cl.
  CPC .............. *B60P 1/433* (2013.01); *B60D 1/46* (2013.01); *B60P 3/122* (2013.01)

(58) Field of Classification Search
  CPC .......... B60P 1/433; B60P 1/18; B60P 1/6454; B60P 3/122; B60D 1/46
  USPC ....... 414/475, 483, 484, 476, 480, 473, 474, 414/482, 485
  See application file for complete search history.

(56) References Cited

U.S. PATENT DOCUMENTS

| | | | | |
|---|---|---|---|---|
| 2,717,707 A * | 9/1955 | Martin | ............. | B60P 3/062 280/149.2 |
| 3,934,740 A * | 1/1976 | Rumell | ............. | B60P 1/6454 280/43.23 |
| 4,568,235 A * | 2/1986 | Bills, Jr. | ............. | B60P 1/18 280/149.2 |
| 4,746,261 A * | 5/1988 | Landoll | ............. | B62D 53/062 414/475 |
| 5,211,413 A * | 5/1993 | Williams | ............. | B60P 1/04 280/149.2 |
| 5,215,426 A * | 6/1993 | Bills, Jr. | ............. | B60P 1/43 414/537 |
| 6,394,734 B1 * | 5/2002 | Landoll | ............. | B60P 1/433 280/149.2 |
| 2015/0375663 A1 * | 12/2015 | Robertson | ............. | B60P 1/18 414/475 |

* cited by examiner

*Primary Examiner* — Mark C Hageman
(74) *Attorney, Agent, or Firm* — Law Office of Mark Brown, LLC; Christopher M. DeBacker (57) ABSTRACT

A trailer including an axle assembly which travels horizontally beneath the trailer, transforming the trailer from a transport position to a loading position. The axle assembly is connected to a tail rod which connects with a tail ramp located at the rear of the trailer. As the axle assembly travels forward, the tail rod is removed from the tail ramp, causing the ramp to tilt down towards the ground away from the trailer bed, allowing a vehicle to be driven up over the ramp and onto the bed of the trailer. A hitch assembly allows the hitch to move in relation to the trailer, preventing damage to a towing vehicle.

10 Claims, 12 Drawing Sheets

TRAILER WITH TILT SYSTEM

CROSS-REFERENCE TO RELATED APPLICATION

This application claims priority in U.S. Provisional Patent Application No. 62/144,580, filed Apr. 8, 2015, which is incorporated herein by reference.

BACKGROUND OF THE INVENTION

1. Field of the Invention

The present invention relates generally to a trailer configured to tilt for loading vehicles, and more specifically to a gooseneck trailer capable of withdrawing the wheels toward the bed of an attached truck, thereby causing the trailer to tilt, allowing for easy loading.

2. Description of the Related Art

In a typical situation where a vehicle is being loaded onto a gooseneck trailer, the user will use a pair of ramps which are placed at the rear of the trailer. It can be difficult to align these ramps with the wheels of the vehicle being loaded to the trailer, and a mistake can cause the vehicle to roll off of the ramps and cause damage to the vehicle, the trailer, or the user.

Another disadvantage of these loading ramps is that they are heavy and cumbersome to set up. Further, these ramps have to be transported along with the trailer, which reduces useable space within the trailer or the vehicle towing the trailer.

What is needed is a simple gooseneck trailer which can quickly and easily transform between a travel position and loading position while providing a safe and reliable ramp for loading vehicles onto the trailer. What is further needed is a simple way to avoid undue pressure on the truck via the gooseneck connection while the trailer is being adjusted and/or loaded.

Heretofore there has not been available a system or method for transforming a trailer for loading and unloading purposes with the advantages and features of the present invention.

SUMMARY OF THE INVENTION

The present invention generally provides a transforming gooseneck trailer capable of transforming from a travel position to a tilted loading position and back quickly and safely. The trailer generally includes a trailer deck for storing a vehicle during travel, and a loading assembly affixed to an end of the trailer deck.

The trailer primarily includes an axle assembly which travels horizontally beneath the trailer, transforming the trailer from a transport position to a loading position. The axle assembly is connected to a tail rod which connects with a tail ramp located at the rear of the trailer. As the axle assembly travels forward, the tail rod is removed from the tail ramp, causing the ramp to tilt down towards the ground away from the trailer bed, allowing a vehicle to be driven up over the ramp and onto the bed of the trailer.

To prevent this pivoting action of the trailer from adversely affecting the towing vehicle, a preferred embodiment includes a gooseneck hitch assembly which provides a spring-powered hitch having an outer tube and an inner tube. The inner tube is connected to the vehicle, and the outer tube is connected to the trailer. The outer tube slides along the inner tube, telescoping away from the inner tube as the trailer transforms into the loading position, and telescoping toward the inner tube as the trailer transforms into the transport position. Locking elements allow the hitch to be used on any suitable vehicle having a gooseneck hitch connector.

An alternative embodiment functions with a typical ball hitch located beneath the bed of a truck. A similar structure allows the hitch assembly to pivot away from the trailer as it transforms from the first, transport position to the second, loading position, and alternatively to pivot toward the trailer as the process is reversed.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Gooseneck Trailer System 2

Figure 1:
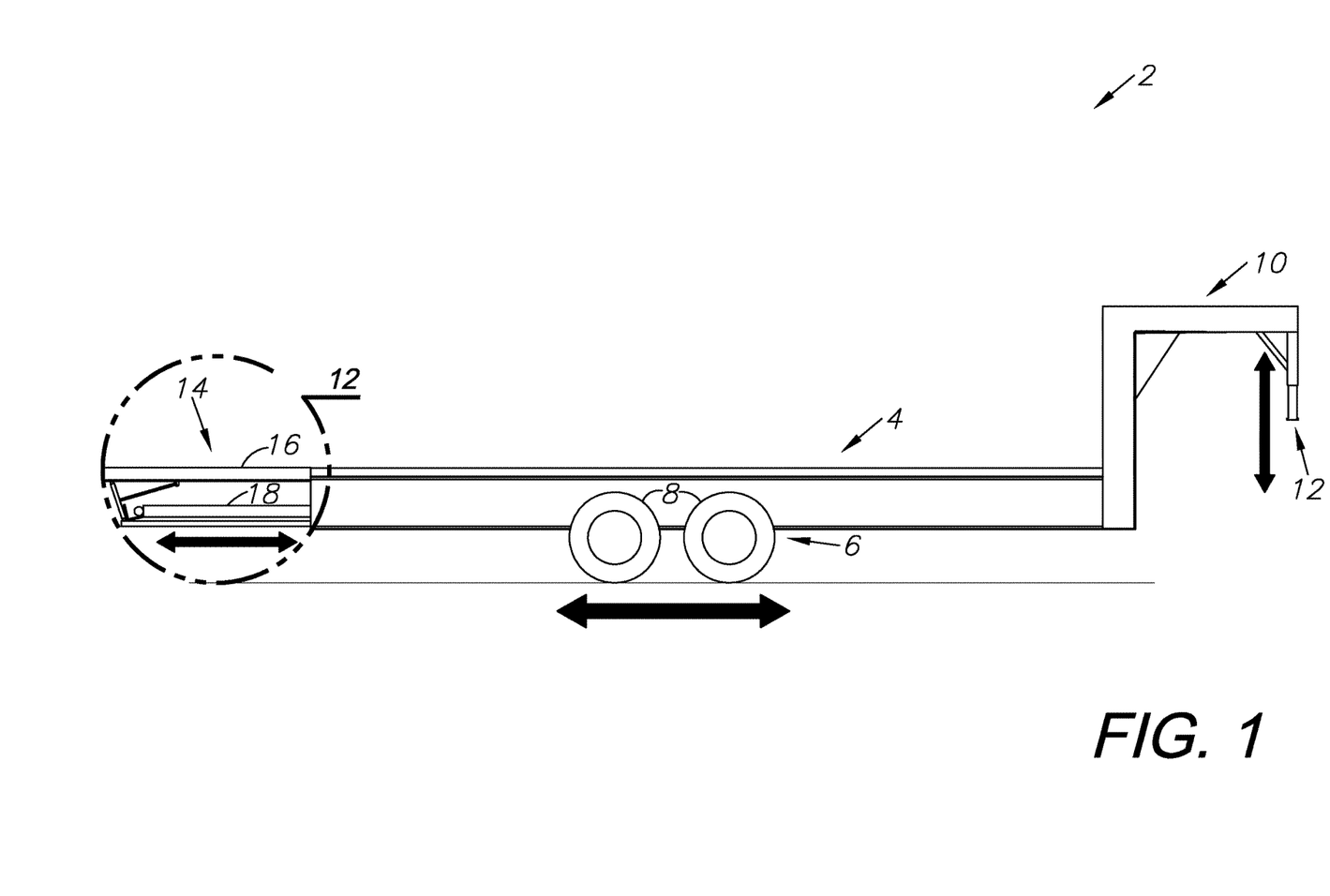
FIG. 1 is a side-elevational view of a preferred embodiment of the present invention shown in a first, transport position.
Figure 2:
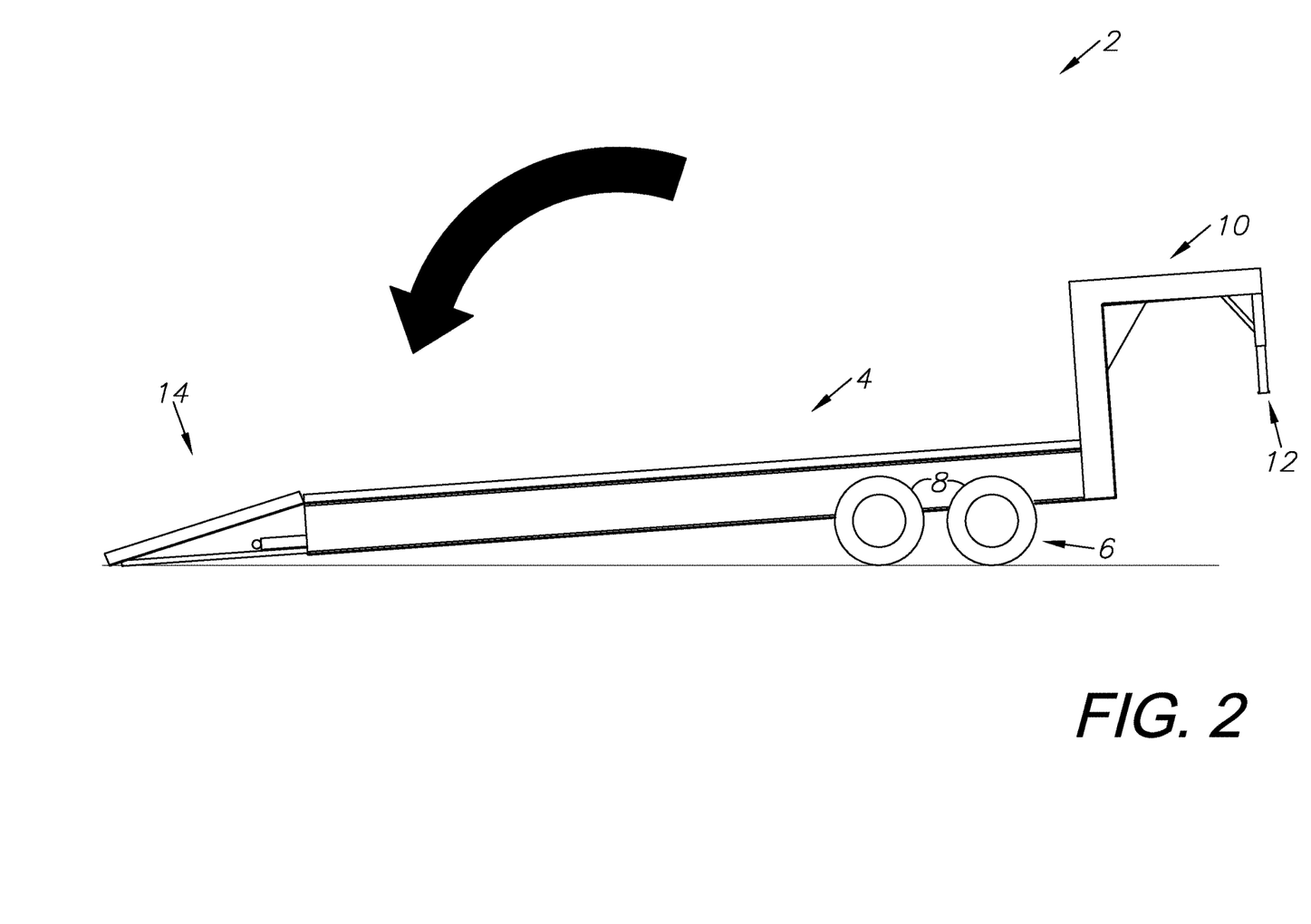
FIG. 2 is a side-elevational view thereof, shown in a second, loading position.

As shown in the Figures, the present invention is a trailer system 2 designed for the transport of vehicles or other items. The preferred embodiment demonstrated in FIGS. 1-13 is a trailer intended to be connected to typical pick-up trucks or similar vehicles via a gooseneck hitch assembly 10. FIG. 1 shows the present invention in a first, transport position. When loading or unloading items or vehicles onto the trailer, the trailer is transformed into a second, loading position as shown in FIG. 2.

The trailer system 2 primarily includes the trailer 4, an axle assembly 6 including the wheels 8, the gooseneck assembly 10 with a modified gooseneck hitch 12, and the tail assembly 14 which includes the tail ramp 16 which is raised and lowered by a rod 18 affixed to the axle assembly 6. The axle assembly 6 is configured to move horizontally along an I-beam 38. As the axle assembly 6 is drawn toward the front end of the trailer 4, the rear end of the trailer dips down and the rod 18 is drawn away from the tail ramp 16, causing the tail ramp to drop further. FIG. 2 shows the trailer in a loading position with the trailer 4 at an incline and the tail ramp 16 in contact with the ground. A vehicle can then be driven directly onto the trailer bed 20.

Figure 3:
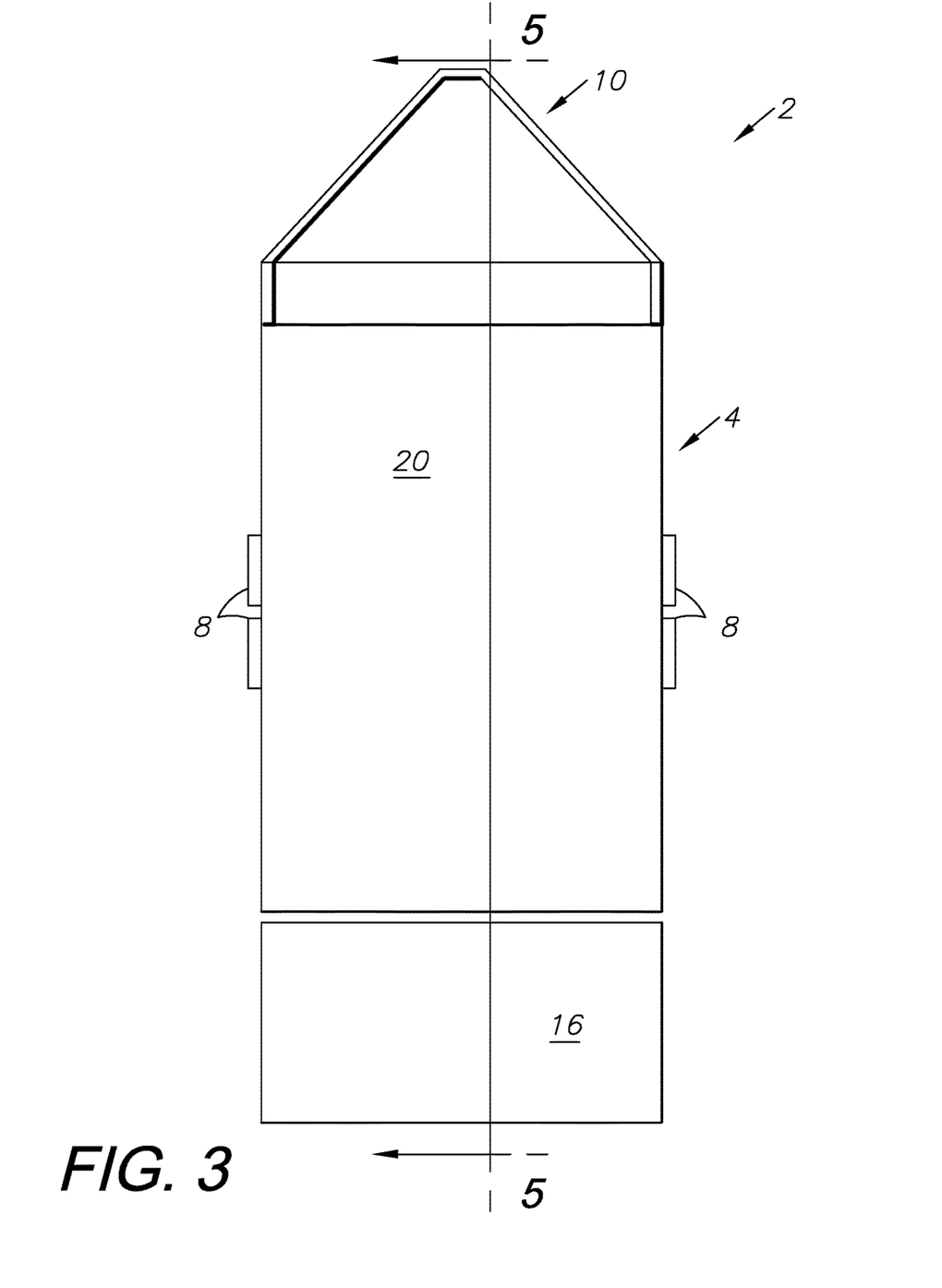
FIG. 3 is a top-plan view of a preferred embodiment of the present invention.
Figure 4:
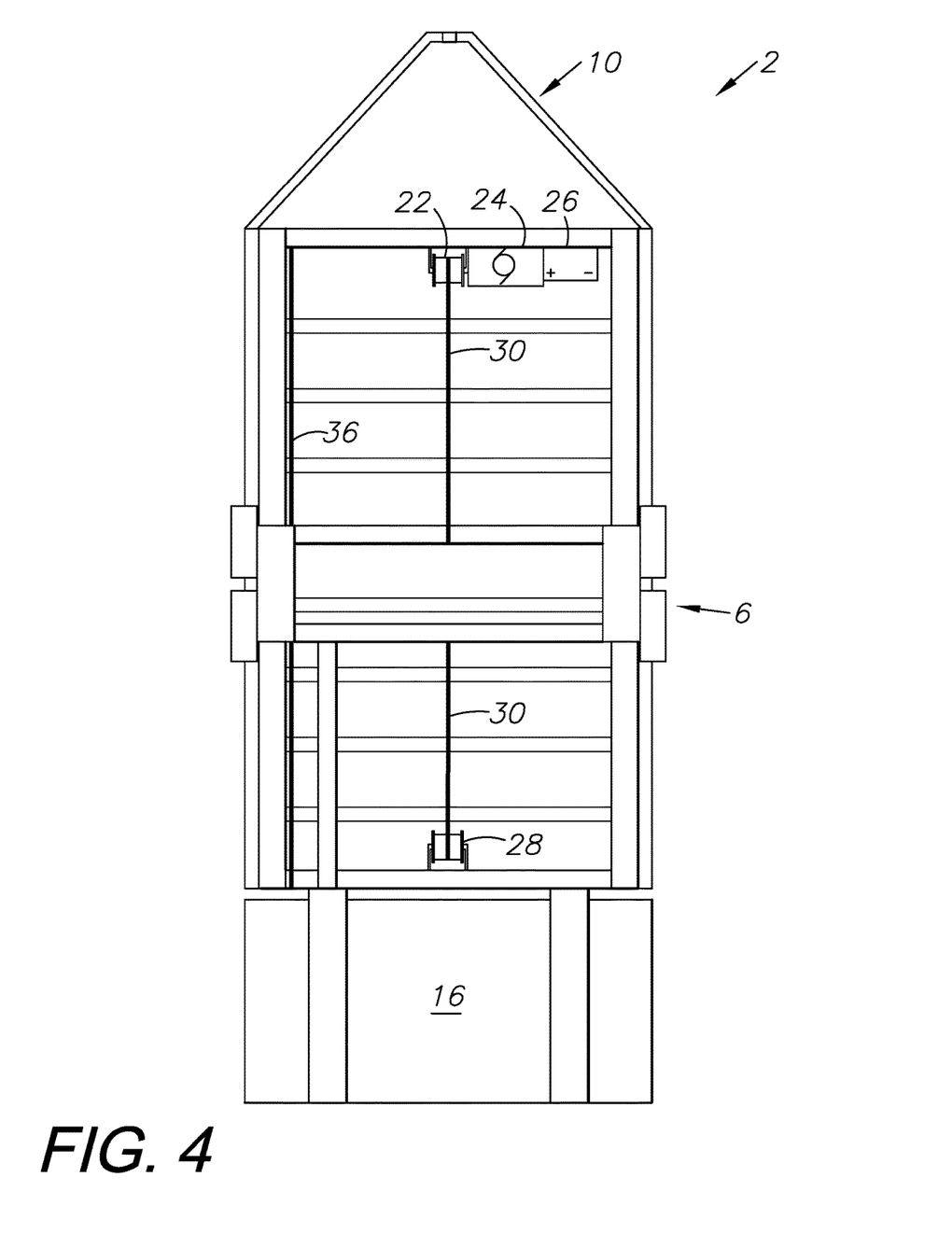
FIG. 4 is a bottom-plan view thereof.

FIG. 3 shows the top of the trailer system 2. FIG. 4 shows the bottom of the trailer system 2 including the winch 22, motor 24, battery 26, and rear pulley 28 which pull the axle assembly 6 forwards and backwards along the I-beams using a chain 30 or cable or other suitable element. The battery 26 could be replaced with any suitable power system, including a gasoline or diesel generator or the towing vehicle.

Figure 5:
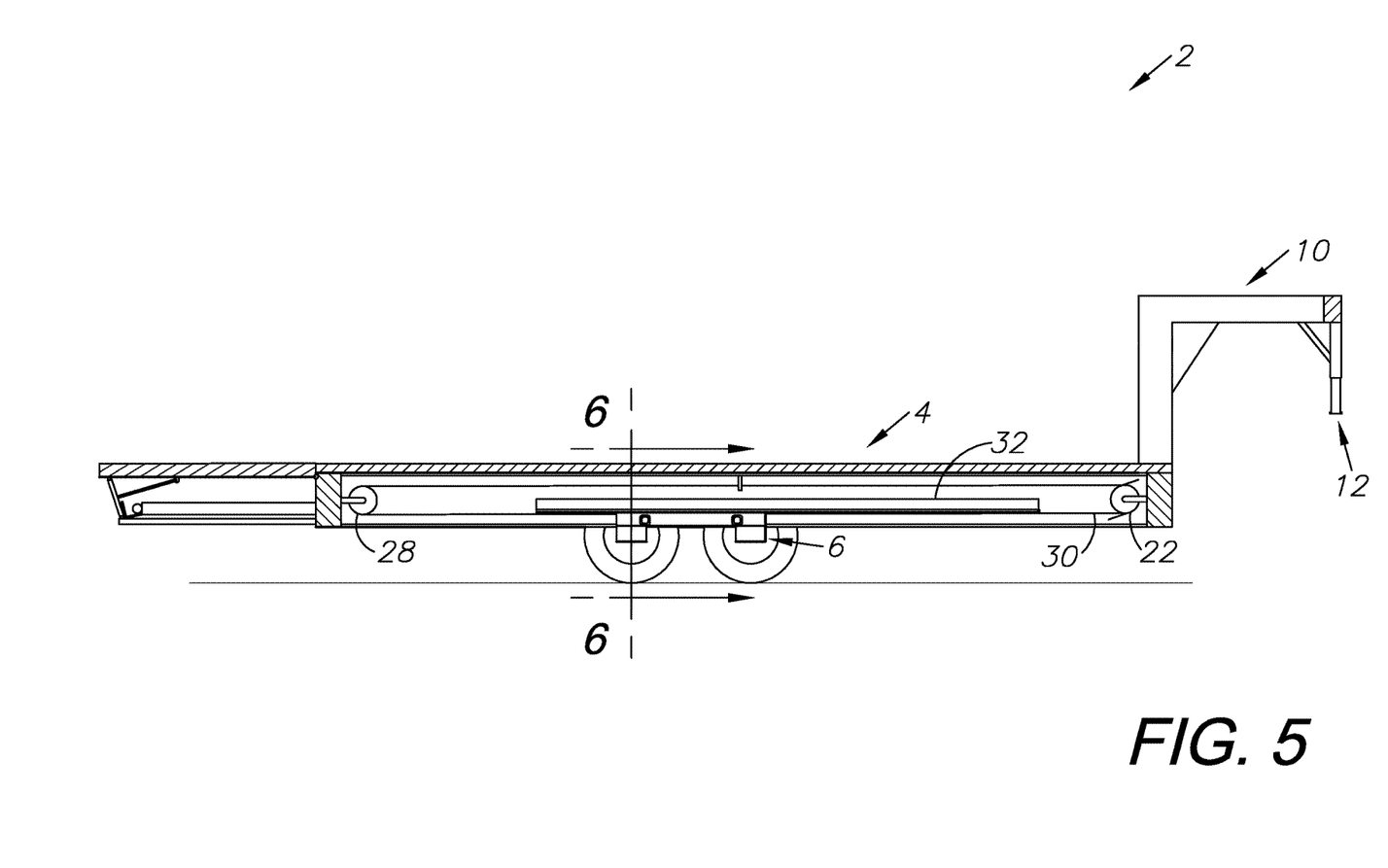
FIG. 5 is a sectional view thereof, taken about the line of FIG. 3.

FIG. 5 shows the axle assembly 6 as it engages the I-beam 38. An L-shaped guard plate 32 is welded to the I-beam above the roller bracket 56 of the axle assembly 6 and prevents gravel, dust, and other debris from falling into the roller bracket 56 and damaging or inhibiting the rollers.

Figure 6:
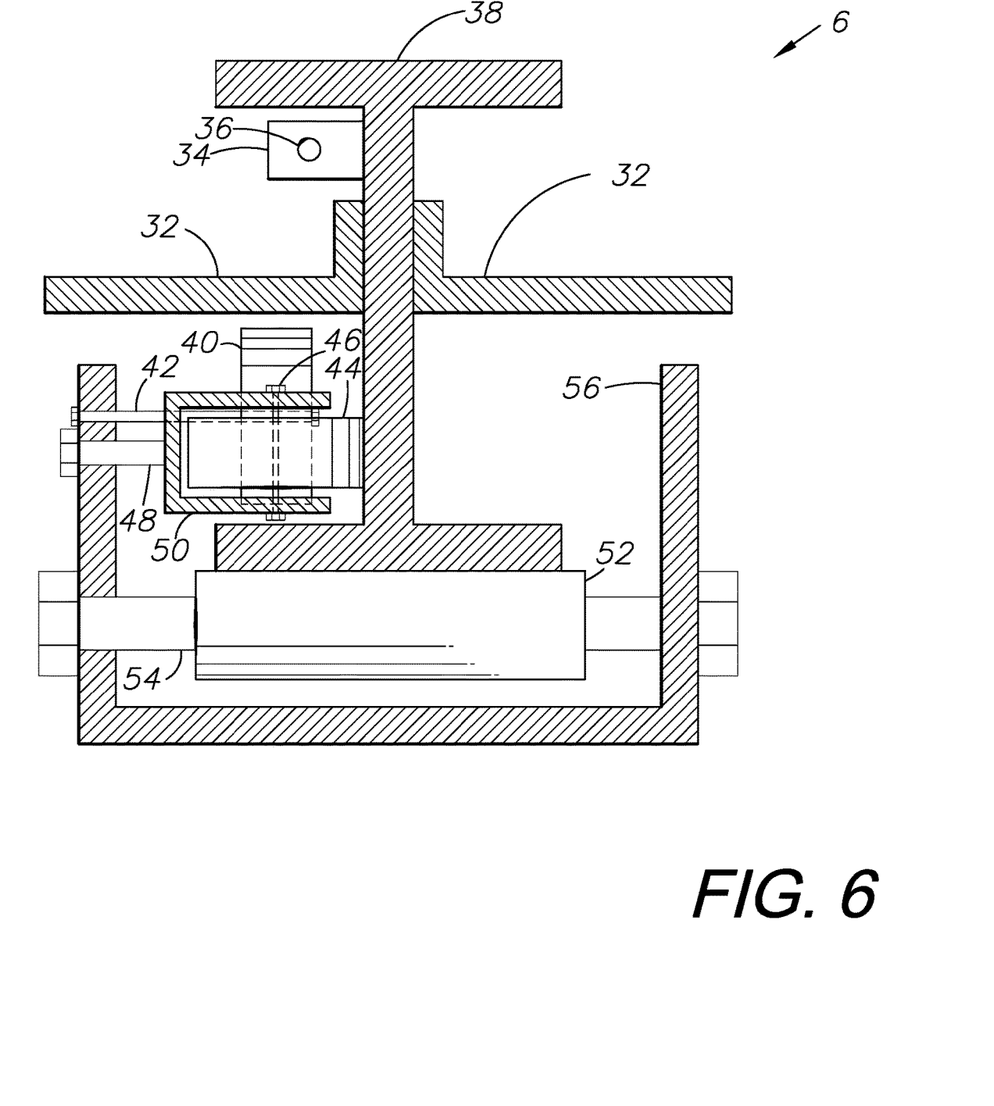
FIG. 6 is a sectional view of a roller bracket element of a preferred embodiment of the present invention, taken about the line of FIG. 5.

FIG. 6 shows the functioning roller elements of the axle assembly 6 in detail, and how the rollers 40, 44, 52 interact with the I-beam 38. The roller bracket 56 mounts a vertically-oriented buffer roller 40 via a first mounting bolt 42. The buffer roller 40 is located a short distance away from the bottom flange of the I-beam 38 and comes into contact with the I-beam when the trailer hits a bump or otherwise causes the trailer structure to move upwards away from the base roller 52. The buffer roller 40 prevents the I-beam from becoming dislodged with the axle assembly 6. A side-roller 44 is in constant contact with the vertical flange of the I-beam 38 and is secured by a side roller bracket 50 mounted to the roller bracket 56 via a second mounting bolt 48. A side roller pin 46 mounts the side roller 44 to the side roller bracket 50. The base roller 52 is in constant contact with the underside of the lower flange of the I-beam 38 and is mounted to the roller bracket 56 via a third mounting bolt 54.

The guard plate 32 is clearly shown in FIG. 6. As discussed above, this prevents debris from entering the roller bracket 56 and causing issues with the various rollers 40, 44, 52.

A rod guide 34 secures a rod 36 to the I-beam 38. The rod 36 carries a coil of power cables for powering the brake lights and other lights of the trailer 4. These lights are required for legal purposes of operating the trailer on roadways. This rod 36 can be carried along with the axle assembly 6, and the coiled power cables allow the flexibility to extend to the rear of the trailer even when the axle assembly 6 is located in the second, loading position.

Figure 7:
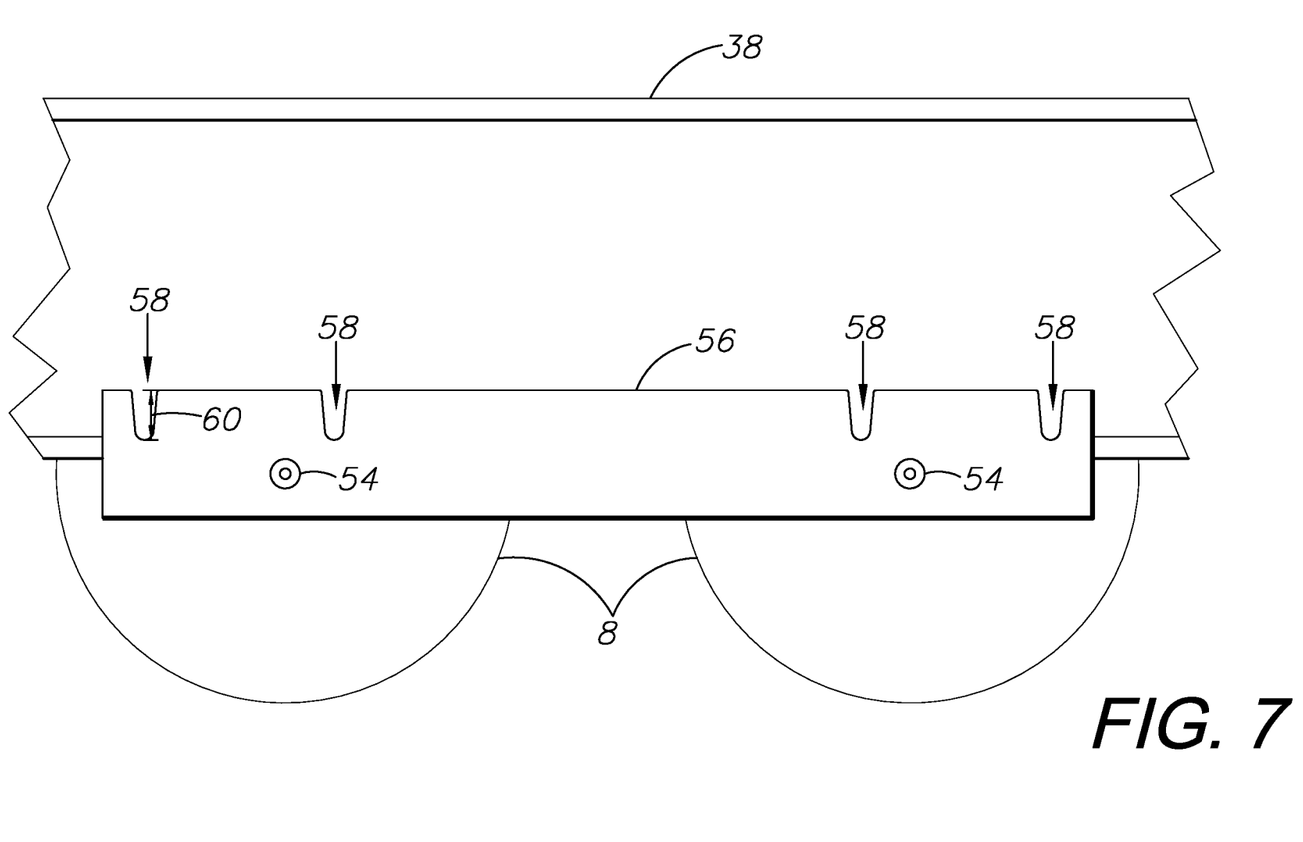
FIG. 7 is a detailed plan view of a roller bracket element of a preferred embodiment of the present invention.

FIG. 7 shows the roller bracket 56 as oriented with the wheels 8 and the I-beam 38. Roller slots 58 are located along the roller bracket 56 for receiving the side-roller 44 and the buffer roller 40. These rollers may be installed anywhere along the selectable length 60 of the roller slots 58 as desired by the user to provide flexibility as to how much the assembly 6 can move vertically before engaging the buffer roller.

Figure 8:
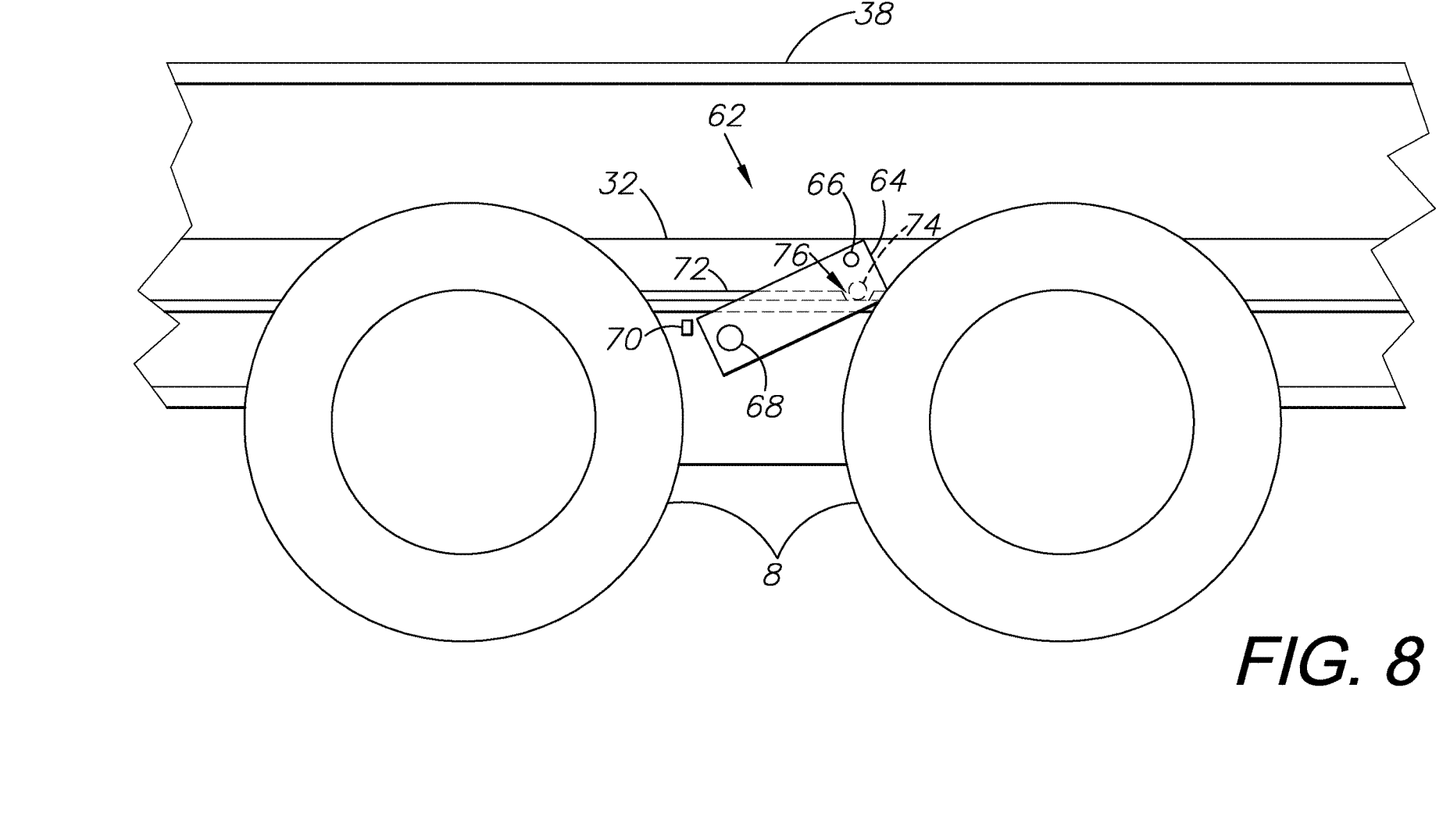
FIG. 8 is a detailed plan view of a manual wheel lock element of the preferred embodiment of the present invention shown in a first, locked position.
Figure 9:
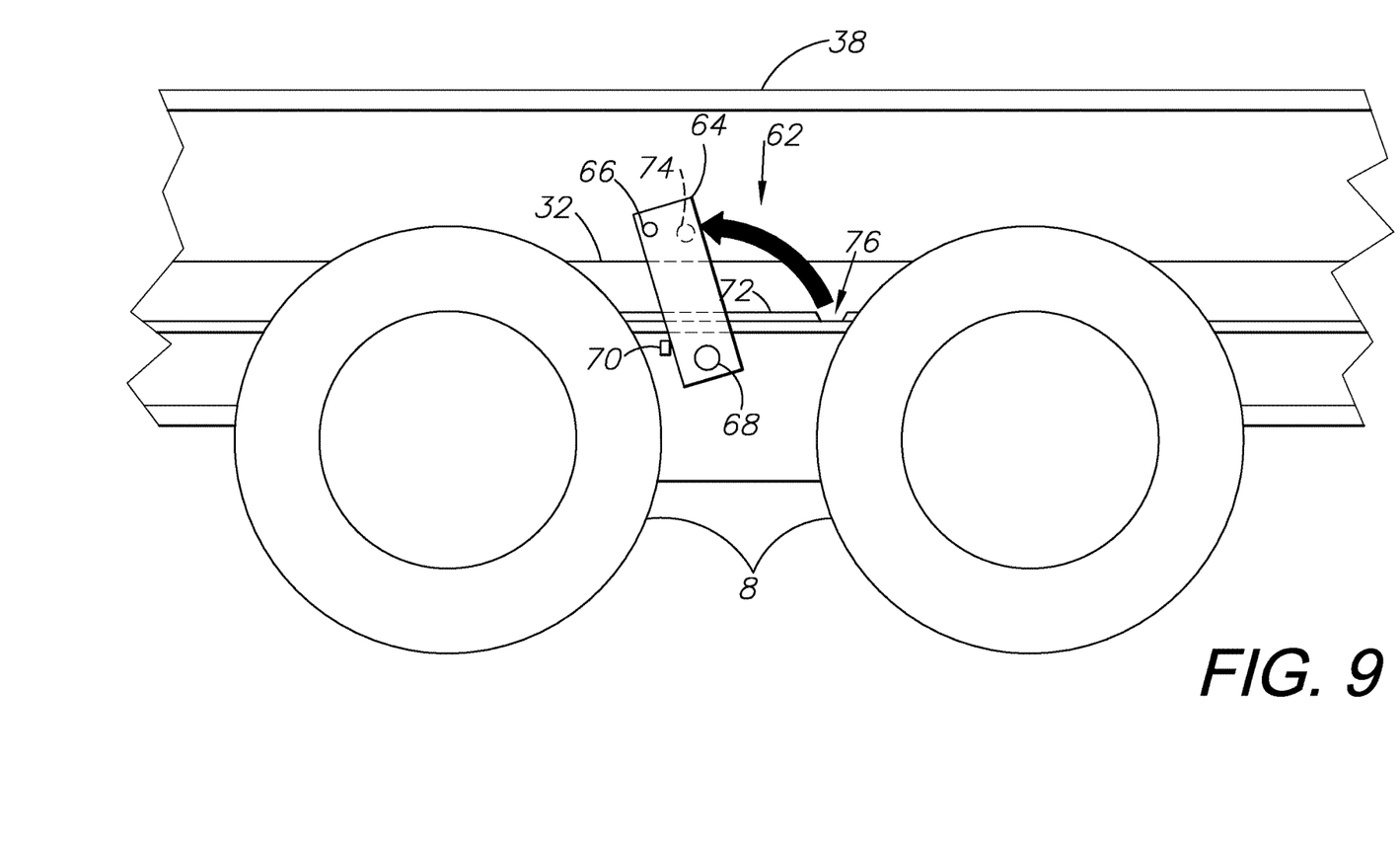
FIG. 9 is a detailed plan view thereof, shown in a second, unlocked position.

FIG. 8 shows an optional yet preferred locking assembly 62 of the preferred embodiment of the present invention. A wheel lock plate 64 includes a gripping knob 66 for manual manipulation of the plate, a pivot bolt 68, and a locking knob 74 for being received within a locking recess 76 of a receiver plate 72 welded to the I-beam 38 and/or the guard plate 32 or in some proximity thereof. FIG. 9 shows how the wheel lock plate 64 can be pivoted about the pivot bolt 68 such that the locking knob 74 is removed from within the locking recess 76, thereby allowing the axle assembly 6 to be drawn forwards or backwards. In a preferred embodiment, multiple locking recesses 76 would be included within the receiver plate 72. A stop 70 prevents the wheel locking plate 64 from pivoting beyond a desired angle.

Figure 10:
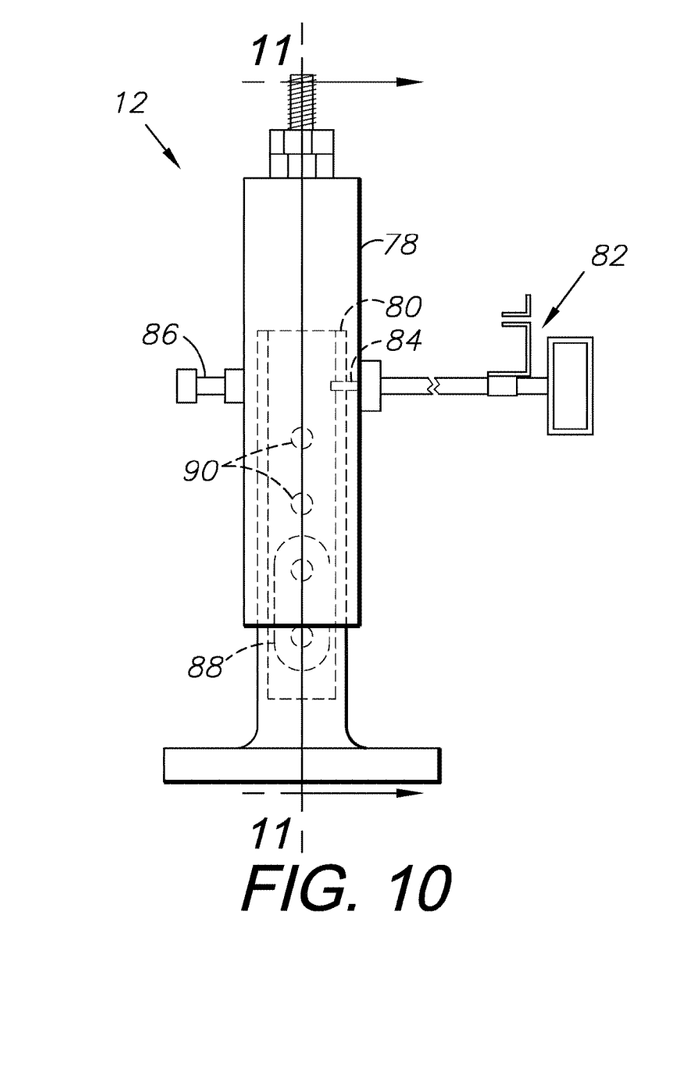
FIG. 10 is an elevational view of a gooseneck hitch element of a preferred embodiment of the present invention.
Figure 11:
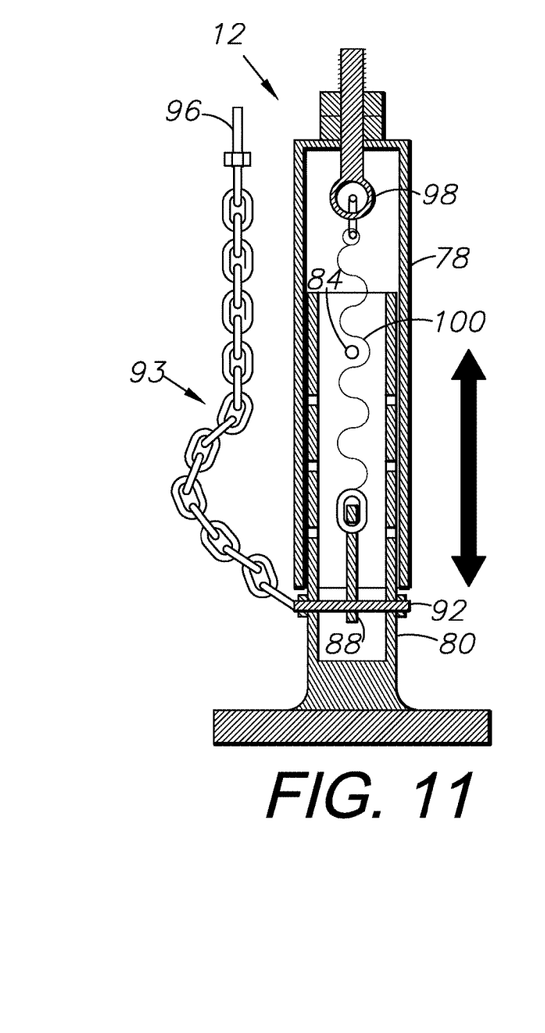
FIG. 11 is a sectional view thereof taken about the line of FIG. 10.

FIGS. 10-11 show the modified gooseneck hitch 12 which allows the trailer system 2 to engage a gooseneck joint within the bed of a truck or other vehicle (not shown). The purpose of the modified gooseneck hitch 12 is to allow the hitch to slide up and down as the trailer transforms between the transport and loading positions, thereby preventing the vehicle from being pulled up or compressed down which could damage the vehicle. As the trailer tilts, the front end of the trailer raises up so the hitch must extend to prevent the vehicle from being drawn upwards as well.

The hitch 12 includes an outer tube 78 and an inner tube 80. An internal spring 100 helps to prevent the hitch from moving upwards or downwards too fast, thereby protecting the vehicle and the hitch components. The spring 100 is connected to a base ring 98 bolted to the top of the outer tube 78 on one end, and to a moveable locking bracket 88 on the other end. Several mounting holes 90 are located within the inner tube 80, and a locking bolt 92 allows the user to select how low the outer tube 78 will drop in relation to the inner tube 80, allowing for adjustment depending upon the vehicle height. A chain 93 can be welded to a static piece of structure via the chain end 96 which prevents the locking bolt 92 from being lost when removed from the inner tube. If it is welded to the outer tube 78, it provides a secondary element preventing the outer tube from rising too far and coming dislodged from the inner tube 80.

The hitch includes a grease port 86 for lubricating the hitch, and a release mechanism assembly 82 for manually releasing the outer tube 78 from the inner tube 80 via a spring-loaded release pin 84. The user simply pulls the release mechanism away from the hitch 12 which releases the release pin 84 from the inner tube, and twists the mechanism thereby locking the release pin in a recessed position. This allows the outer tube to move freely upward and downward along the inner tube.

Figure 12:
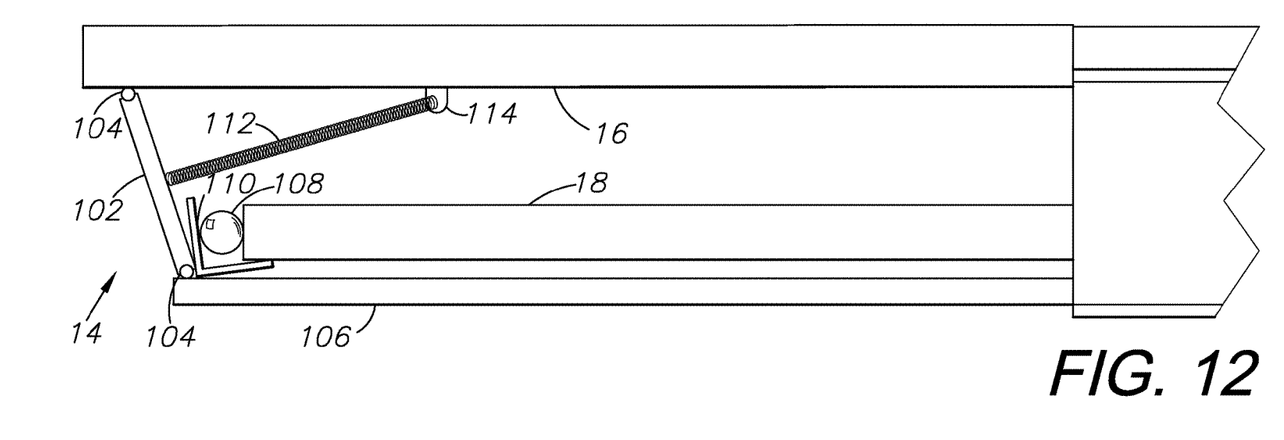
FIG. 12 is a detailed plan view of a tail element of a preferred embodiment of the present invention in a first, transport position taken about the circle of FIG. 1.
Figure 13:
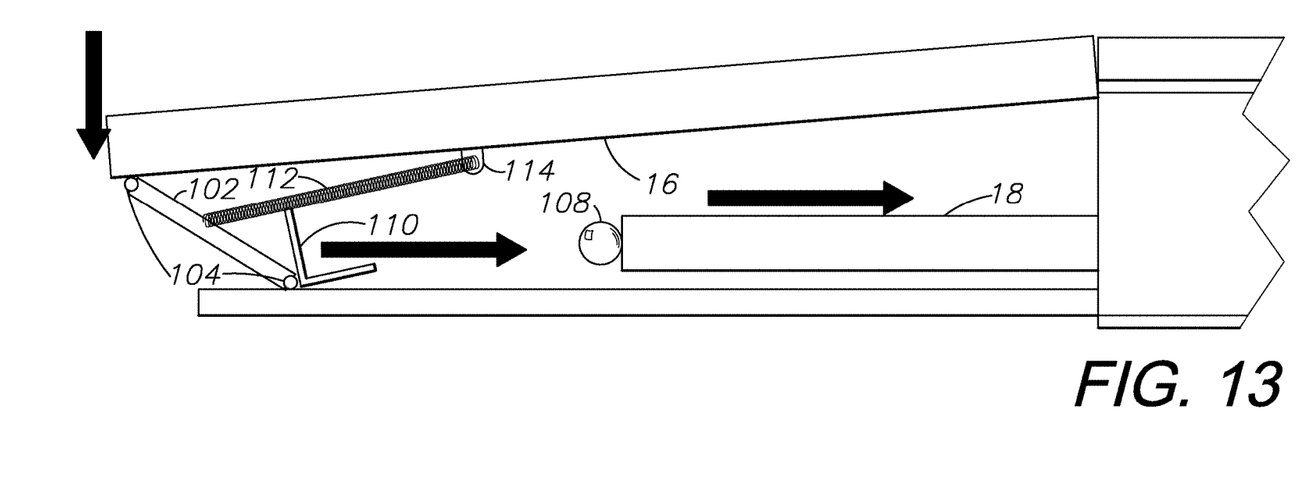
FIG. 13 is a detailed plan view thereof, showing the tail element in a second, loading position.

FIGS. 12 and 13 demonstrate how the tail ramp 16 operates in conjunction with the tail rod 18. The tail rod 18 terminates into a ball joint 108 which is received within a greased receiver 110 hingedly connected to a support rod 102 which includes rollers 104 on either end. A tension spring 112 is connected to the support rod 102 and an anchor 114 located on the underside of the ramp 16. The tail rod 18 is affixed to the axle assembly 6 and as the axle assembly is drawn forward, the tail rod 18 moves away from the receiver 110. Gravity then causes the ramp assembly 14 to drop down until it comes into contact with the ground. As the axle assembly moves toward the rear of the trailer, the tail rod 18 re-engages with the receiver 110 which is forced reward. The spring 112 assists in pulling the support rod 102 forward, thus pushing the ramp 16 up. The bottom roller 104 of the support rod 102 engages a piece of structure 106 extending out below the ramp 116.

In this way, the entire trailer system 2 works as a single assembly which transforms the trailer from the first, transport position to the second, loading position and back merely by drawing the axle assembly 6 towards the front or rear of the trailer respectively. The tail ramp assembly 14 moves in accordance with the axle assembly due to the tail rod 18, and the hitch assembly 10 adjusts the hitch 12 as described above, preventing damage to the vehicle as the trailer transforms.

III. Alternative Embodiment Trailer System 152

Figure 14:
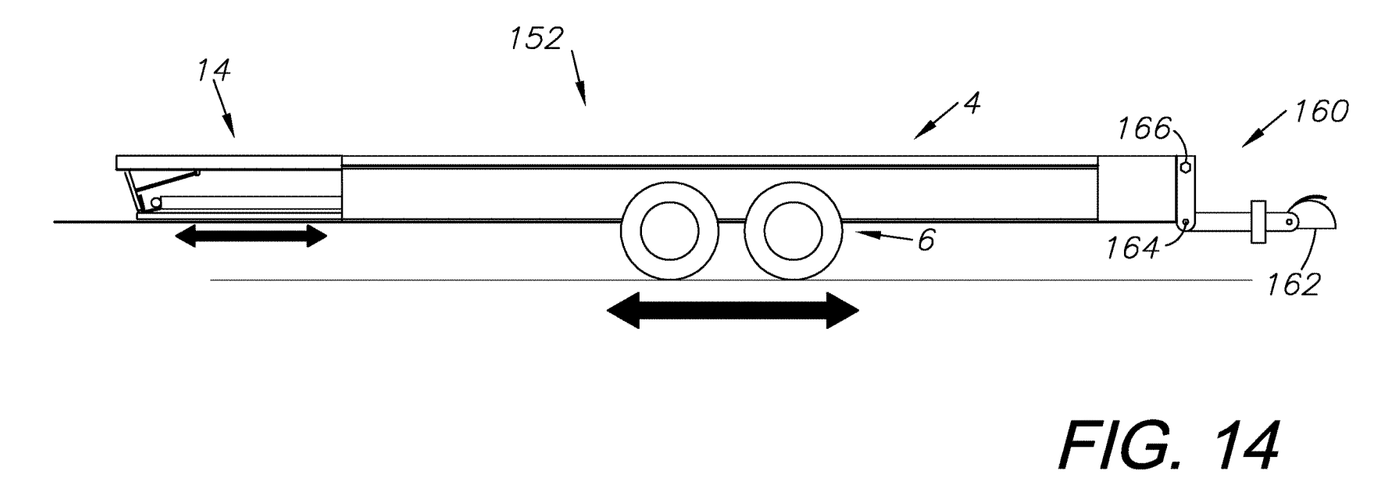
FIG. 14 is a side-elevational view of an alternative embodiment of the present invention in a first, transport position.
Figure 15:
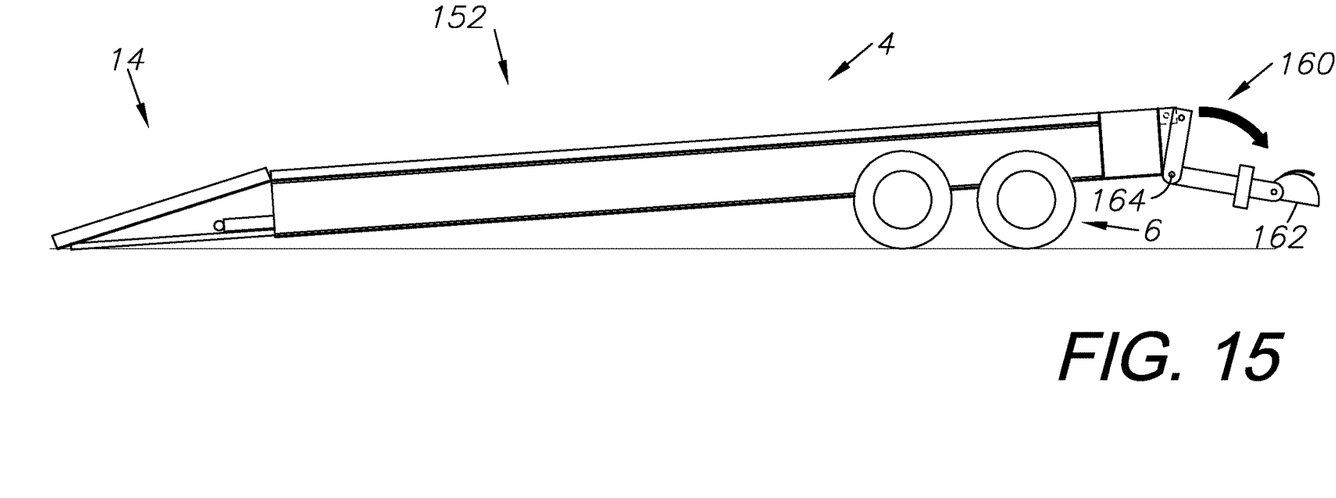
FIG. 15 is a side-elevational view thereof, showing a second, loading position.

While the previous embodiment is useful for vehicles with a gooseneck hitch assembly, a much more common trailer hitch is the standard ball hitch which is available on most small and large trucks. FIGS. 14-15 show an embodiment which provides the trailer system presented above with changes to accommodate a ball hitch.

Here, the hitch assembly 160 is mounted to the front end of the trailer 4 on a hinge 164. The assembly 160 is bolted to the trailer structure via a locking bolt 166. Before transforming the trailer to the loading position, the bolt 166 should be removed. The trailer can remain hitched to the vehicle (not shown) via the ball hitch 162 and as the rear end of the trailer drops, the hitch assembly 160 is allowed to pivot away from the trailer 4, keeping the vehicle stable. When the system transforms back to the transport position, the bolt 166 simply is replaced. Springs or other elements may be used for additional protection and prevention of damage to the vehicle.

As shown in FIG. 15, the hitch assembly 160 can tilt downwards to compensate for the rise in the front end of the trailer 14.

Alternatively, this embodiment does not require the tail ramp assembly 14 as previously described. Instead, the trailer could simply end in a ramp which touches the ground as the axle assembly 6 moves forward.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A trailer system comprising:
a trailer including a trailer bed having a front end and a rear end;
a hitch assembly mounted in proximity with said trailer bed front end;
an axle assembly mounted beneath said trailer bed;
said axle assembly configured to travel forwardly and rearwardly beneath said trailer bed, thereby raising said front end of said trailer bed and lowering said rear end of said trailer bed, and thereby transforming said trailer from a first, transport position to a second, loading position;
said hitch assembly including a gooseneck hitch connector for connecting to a gooseneck hitch receiver located on a vehicle;
said gooseneck hitch connector including an outer tube slideably engaged over an inner tube;
a plurality of mounting holes passing through said inner tube;
a locking pin placed through one of said plurality of said mounting holes, said locking pin restricting said outer tube from traveling below said locking pin;
said locking pin passing through a locking bracket contained within said inner tube, said locking bracket connected to a first end of a spring, a second end of said spring being connected to a receiver bolt affixed to a top end of said outer tube; and
a manual release mechanism configured to be transferred from a first, locked position to a second, unlocked position, thereby allowing said outer tube to slide vertically about said inner tube; and
whereby said hitch assembly is configured to adjust according to the position of said front end of said trailer bed using said spring, thereby compensating for a change in height of the front end of said trailer bed.

2. The system of claim 1, further comprising:
a tail ramp assembly hingedly mounted in proximity with said trailer bed rear end;
whereby said tail ramp assembly is configured to be lowered from a respective first, transport position to a respective second, loading position as said axle assembly travels beneath said trailer bed.

3. The system of claim 2, further comprising:
a tail rod affixed to said axle assembly, said tail rod terminating at a ball joint received by a receiver connected to said tail ramp assembly;
a support configured to position said tail ramp assembly at a level orientation with said trailer bed when said trailer is located at said first, transport position;
said tail rod configured to be drawn toward said front end of said trailer as said trailer transforms from said first, transport position to said second, loading position, thereby withdrawing said ball joint from said receiver; and
whereby said tail ramp assembly is configured to pivot downward about a pivot point between said tail ramp assembly and said trailer bed from said first, transport position to said second, loading position.

4. The system of claim 1, further comprising:
said axle assembly including a roller bracket including a plurality of rollers configured for engaging a structural beam affixed beneath said trailer bed; and
said rollers further configured to guide said axle assembly along said structural beam.

5. The system of claim 4, further comprising:
wherein said structural beam is an I-shaped beam having a horizontal top flange, a horizontal bottom flange, and a vertical web joining said horizontal top flange and said horizontal bottom flange;
said plurality of rollers including a base roller engaging a bottom face of said horizontal bottom flange;
said plurality of rollers including a side roller engaging said vertical web; and
said plurality of rollers including a buffer roller in proximity with a top face of said horizontal bottom flange, a gap separating said buffer roller from said top face.

6. The system of claim 5, further comprising:
a guard plate welded to said web of said I-shaped beam, said guard plate located above said plurality of rollers; and
said guard plate configured to prevent debris from contacting said plurality of rollers.

7. The system of claim 1, further comprising a chain having a first end and a second end, said first end of said chain affixed to said locking pin and said second end of said chain affixed to said trailer hitch assembly.

8. The system of claim 1, further comprising a wheel locking assembly including:
a lock plate having a front face and a rear face, a gripping knob affixed to said front face and a locking knob affixed to said rear face;
said wheel locking assembly bolted to said trailer via a pivot bolt;
a receiver plate affixed to said trailer in proximity to said lock plate, said receiver plate configured to receive said locking knob, thereby preventing said axle assembly from traveling beneath said trailer bed; and
the wheel locking assembly configured to transform between a first, locked position wherein said locking knob is located within a receiver within said receiver plate and a second, unlocked position wherein said locking knob is removed from said receiver.

9. A trailer system comprising:
a trailer including a trailer bed having a front end and a rear end;
a hitch assembly mounted in proximity with said trailer bed front end;
an axle assembly mounted beneath said trailer bed;
said axle assembly including a roller bracket including a plurality of rollers configured for engaging a structural beam affixed beneath said trailer bed;
said rollers further configured to guide said axle assembly along said structural beam;
a tail ramp assembly hingedly mounted in proximity with said trailer bed rear end;
a tail rod affixed to said axle assembly, said tail rod terminating at a ball joint received by a receiver connected to said tail ramp assembly;
said axle assembly configured to travel forwardly and rearwardly beneath said trailer bed, thereby raising said front end of said trailer bed and lowering said rear end of said trailer bed, and thereby transforming said trailer from a first, transport position to a second, loading position;
wherein said structural beam is an I-shaped beam having a horizontal top flange, a horizontal bottom flange, and a vertical web joining said horizontal top flange and said horizontal bottom flange;
said plurality of rollers including a base roller engaging a bottom face of said horizontal bottom flange;
said plurality of rollers including a side roller engaging said vertical web;
said plurality of rollers including a buffer roller in proximity with a top face of said horizontal bottom flange, a gap separating said buffer roller from said top face;
a guard plate welded to said web of said I-shaped beam, said guard plate located above said plurality of rollers;
said guard plate configured to prevent debris from contacting said plurality of rollers;
whereby said tail ramp assembly is configured to be lowered from a respective first, transport position to a respective second, loading position as said axle assembly travels beneath said trailer bed; and
whereby said hitch assembly is configured to adjust according to the position of said front end of said trailer bed, thereby preventing said hitch assembly from pushing down or pulling up against a vehicle to which said hitch assembly is affixed.

10. The system of claim 9, further comprising:
said hitch assembly including a ball hitch connector for connecting to a ball hitch receiver located on a vehicle;
said hitch assembly further including a pivot bolt pivotally mounting said hitch assembly to said trailer;
a removable retaining bolt connecting said hitch assembly to said trailer, thereby preventing said hitch assembly from pivoting about said pivot bolt; and
whereby said retaining bolt is configured to be removed, thereby allowing said hitch assembly to pivot about said pivot bolt as said trailer is transformed between said first, transport position and said second, loading position.

* * * * *